Aug. 23, 1932.　　B. M. BROWNELL　　1,872,665
SWIVEL PIPE COUPLING
Filed May 22, 1931
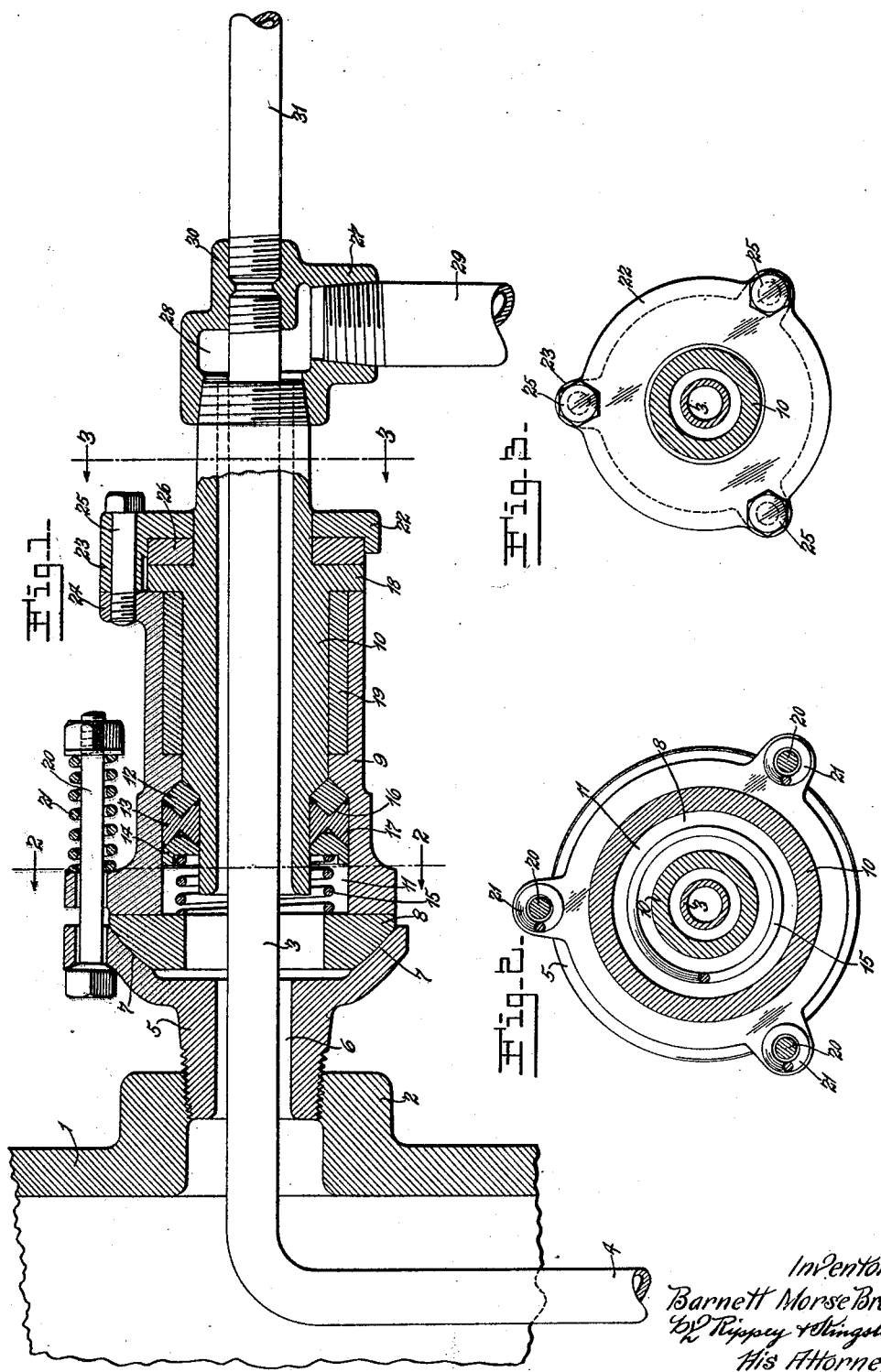
Inventor
Barnett Morse Brownell
by Rippey & Kingsland
His Attorneys.

Patented Aug. 23, 1932

1,872,665

UNITED STATES PATENT OFFICE

BARNETT MORSE BROWNELL, OF UNIVERSITY CITY, MISSOURI, ASSIGNOR TO DIAMOND METAL PRODUCTS COMPANY, A CORPORATION OF MISSOURI

SWIVEL PIPE COUPLING

Application filed May 22, 1931. Serial No. 539,155.

This invention relates to a revolvable pipe coupling and particularly of the type which may be used for a connection with a revolving roll whereby steam may be conveyed to the roll and the water of condensation removed therefrom.

An object of this invention is to provide a coupling of the type described which will be economical to manufacture and efficient and durable in use.

Other objects will be apparent from the following detail description taken in connection with the accompanying drawing, in which—

Fig. 1 is a longitudinal section of the coupling connected to a roll shown diagrammatically.

Fig. 2 is a cross section on line 2—2, Fig. 1.

Fig. 3 is a cross section on line 3—3, Fig. 1.

A hollow roll 1 has a boss 2 about the center line of which it may be caused to revolve. A pipe 3 extends into the interior of the roll 1 through a central opening in the boss 2 and has a downwardly extending elbow 4 which reaches substantially to the bottom of the roll whereby the water of condensation may be removed.

The boss 2 is internally threaded to receive the end of a coupling member 5 through which live steam may be admitted to the interior of the roll 1 through a bore 6 substantially larger than the diameter of the pipe 3 which extends through the bore. The outer end of the member 5 is cup-shaped and has an annular arcuate ground surface 7 into which fits a ring 8 having a concave surface complementary to the arcuate surface 7. The ring 8 has an accurately ground flat face which abuts the rear face of a sleeve member 9.

A cylindrical member 10 with an exterior of peculiar conformation, as will presently be described, telescopes within and is secured in relation to the sleeve member 9. The relationship between the sleeve 9 and the cylindrical member 10 is such that one may be rotated with respect to the other. The interior surface at the rear end of the sleeve 9 is relieved and the exterior surface of the rear end of the cylindrical member 10 is relieved to form an annular cavity 11 between them. Each of the relieved surfaces are bevelled at the inner end of the cavity 11. This cavity is formed for the purpose of providing a seat for packing means which comprise a ring 12, a ring 13, a ring 14 and a helical spring 15. The ring 12 may be of square cross section thus fitting against the bevels of the cavity 11 and against an angular groove 16 in the ring 13. The ring 13 also has an angular groove 17 into which fits a bevelled surface of the ring 14. A spiral spring 15 presses against the ring 14 thus holding the packing rings in place and forming an efficient seal between the sleeve 9 and the cylindrical member 10.

The cylindrical member 10 has an annular flange 18 whose rear edge bears against the front edge of the sleeve 9. The inner surface of the sleeve 9 is cut away forming an annular channel in which is inserted a cylindrical packing member 19.

The member 5 and the sleeve 9 each have corresponding lugs through which may be inserted bolts 20 for the purpose of securing these members together. A helical spring 21 bearing against the lug on the member 9, and the nut on the bolt 20, together with the arcuate surface 7 and its connection with the annular member 8, permit a variation in position between the member 5 and the sleeve 9 without destroying the seal.

An annular member 22 serves the purpose of securing and positioning the sleeve 9 with respect to the cylindrical member 10. This annular member 22 has radially extending lugs 23 co-operating with corresponding lugs 24 on the sleeve 9 and through which extend bolts 25. The conformation and arrangement of the annular member 22 with respect to the cylindrical member 10, and more particularly the flange 18, is such as to provide an annular space in which is inserted a packing washer 26.

A header 27 has a cavity 28 with which communicates the cylindrical member 10 and a supply pipe 29. The header also has a boss 30 constituting as it were, a part of the end wall of the cavity 28. The boss is bored and threaded to receive at its inner side the end of the pipe 4, and at its outer side the end of a discharge pipe 31.

Live steam may be introduced through the pipe 29 into the interior of the roll 2 and the water of condensation may be removed through the pipe 4 and the pipe 31. The roll 1 may be freely rotated with respect to the supply connection, that is the sleeve 9 may be freely rotated with respect to the cylindrical member 10. On account of the peculiar swivel connection provided between the member 5 and the sleeve 9 variations in alinement may be made between the supply means and the roll without affecting the seal between the elements.

It will thus be seen that the invention accomplishes its objects. A fluid connection between means of supply and a rotating member has been provided which is simple in construction and efficient in operation.

It is to be understood that parts of the invention may be used without the whole and that various changes may be made in the details of construction within the scope of the appended claims without departing from the spirit of this invention.

I claim:

1. A pipe coupling comprising a member adapted to be secured to a rotating device and communicating with the interior thereof, said member having on its outer end an annular arcuate surface, a sleeve having a surface complementary to said annular arcuate surface and co-operating therewith, means for resiliently securing said member and the sleeve together in operative relationship, a tubular member telescoping within said sleeve and adapted to be rotated with respect thereto, and means for sealing the joint between the sleeve and the tubular member to prevent leakage from the interior of said tubular member.

2. A coupling of the character described comprising a coupling member adapted to be secured to a rotating device, a pair of members, one telescoping within and overlapping the other for a substantial distance and rotatable one with respect to the other, means forming a swivel coupling between said coupling member and one of said telescoping members, means for packing the internal connection between the telescoping members, and means forming a connection between the second telescoping member and a supply pipe.

3. A coupling of the character described comprising a coupling member, a pair of cylindrical members, one telescoping within the other and arranged and adapted to rotate one with respect to the other, means forming a resilient ball in socket joint between said coupling member and one of said telescoping members, a header attached to the other of said telescoping members, means for securing a supply pipe connected to said header, a bored boss on the header, a tube secured to the header communicating with said bore and extending through the inner telescoping member and the coupling member, and means for connecting a pipe to the exterior side of the bore.

4. A coupling of the character described including a coupling member having an annular arcuate surface, a pair of telescoping members, an intermediate annular member having one face formed complementary to and bearing against said annular arcuate surface and the other face flat and bearing against the end of one of said telescoping members, packing for the connection between said telescoping members, and a spring seated against the flat face of said intermediate member and pressing against said packing.

5. A swivel pipe coupling comprising a coupling member having a concave inner face and having a central passageway therethrough, a sleeve member yieldingly connected with said coupling member, a ring having a convex face matching the concave face of said coupling member, said ring member being interposed between the adjacent ends of said coupling member and said sleeve member, an internal sleeve member mounted within and revoluble with respect to said first sleeve member, said sleeve members being spaced apart at their inner ends to form a packing gland, a packing gasket construction within said gland, and a spring interposed between said gasket construction and the inner face of said ring member.

6. A swivel pipe coupling comprising a coupling member having a concave inner face and having a central passageway therethrough, a sleeve member connected with said coupling member, a ring having a convex face matching the concave face of said coupling member, said ring member being interposed between the adjacent ends of said coupling member and said sleeve member, an internal sleeve member mounted within and revoluble with respect to said first sleeve member, said sleeve members being spaced apart at their inner ends to form a packing gland, a bearing ring between said sleeve members, a packing gasket construction within said gland, and a spring interposed between said gasket construction and the inner face of said ring member.

BARNETT MORSE BROWNELL.